(12) United States Patent
Chen et al.

(10) Patent No.: US 7,250,140 B2
(45) Date of Patent: Jul. 31, 2007

(54) FCC REACTOR

(75) Inventors: Ye-Mon Chen, Sugar Land, TX (US); Thomas Shawn Dewitz, Bellaire, TX (US); Hendricus Arien Dirkse, Amsterdam (NL); Hubertus Wilhelmus Albertus Dries, Amsterdam (NL); Richard Addison Sanborn, Houston, TX (US)

(73) Assignee: Shell Oil Company, Houston, TX (US)

( * ) Notice: Subject to any disclaimer, the term of this patent is extended or adjusted under 35 U.S.C. 154(b) by 527 days.

(21) Appl. No.: 10/475,400

(22) PCT Filed: Apr. 11, 2002

(86) PCT No.: PCT/EP02/04142

§ 371 (c)(1),
(2), (4) Date: Oct. 20, 2003

(87) PCT Pub. No.: WO02/086019

PCT Pub. Date: Oct. 31, 2002

(65) Prior Publication Data

US 2004/0120863 A1 Jun. 24, 2004

(51) Int. Cl.
*B32B 5/02* (2006.01)
(52) U.S. Cl. .................. 422/144; 422/142; 422/143; 422/145; 422/147
(58) Field of Classification Search ............ 422/139, 422/141, 142, 144, 145, 147; 208/106, 108, 208/113
See application file for complete search history.

(56) References Cited

U.S. PATENT DOCUMENTS

| 4,988,430 | A | | 1/1991 | Sechrist et al. ............ 208/113 |
| 5,006,495 | A | * | 4/1991 | Pappal et al. ............... 502/42 |
| 5,009,853 | A | * | 4/1991 | Kovacs et al. ............ 422/144 |
| 5,449,498 | A | * | 9/1995 | Cetinkaya .................. 422/144 |
| 5,843,377 | A | * | 12/1998 | Fandel et al. .............. 422/144 |
| 5,869,008 | A | | 2/1999 | Dewitz ...................... 422/144 |
| 7,026,262 | B1 | * | 4/2006 | Palmas et al. ............... 502/41 |

FOREIGN PATENT DOCUMENTS

| EP | 0 545 771 | 6/1993 |
| WO | 00/27949 | 5/2000 |
| WO | 01/03847 | 1/2001 |

OTHER PUBLICATIONS

Fig 17-36 of Perry's Chemical Engineers' Handbook, McGraw Hill, 7ed Edition, 1997.

* cited by examiner

*Primary Examiner*—N. Bhat
(74) *Attorney, Agent, or Firm*—William E. Hickman

(57) ABSTRACT

A fluid catalytic reactor vessel having at its upper end a single centrally positioned primary cyclone having a gas-solids inlet fluidly connected to the downstream end of a fluid catalytic riser, which riser is positioned externally from a fluid catalytic reactor vessel. The primary cyclone is further provided with a gas outlet conduit at its upper end fluidly connected to one or more secondary cyclone separators, which secondary cyclone separators are positioned in the space between the centrally positioned primary cyclone and the wall of the reactor vessel and which secondary cyclones have means to discharge solids to the lower end of the reactor vessel and means to discharge a gaseous stream poor in solids to a gas outlet of the reactor vessel. The primary cyclone is further provided with a primary stripping zone at its lower end and means to discharge pre-stripped solids from the primary cyclone to the lower end of the reactor vessel. The reactor vessel further comprises at the lower end of reactor vessel a secondary stripping zone is and means to discharge stripped solids from the reactor vessel.

16 Claims, 2 Drawing Sheets

FCC REACTOR

FIELD OF THE INVENTION

The invention is related to Fluid catalytic reactor vessel comprising:

at its upper end a single centrally positioned primary cyclone having a gas-solids inlet fluidly connected to the downstream end of a fluid catalytic riser, which riser is positioned externally from the fluid catalytic reactor vessel;

said primary cyclone further provided with a gas outlet conduit at its upper end fluidly connected to one or more secondary cyclone separators, which secondary cyclone separators are positioned in the space between the centrally positioned primary cyclone and the wall of the reactor vessel and which secondary cyclones have means to discharge solids to the lower end of the reactor vessel and means to discharge a gaseous stream poor in solids to a gas outlet of the reactor vessel. The lower end of the vessel is furthermore provided with a stripping zone.

BACKGROUND OF THE INVENTION

Such a reactor is described in U.S. Pat. No. 5,449,498. According to this publication the lower end of the primary cyclone is provided with an opening to allow stripping gas and stripped hydrocarbons as discharged upwardly from the stripping zone to enter the primary cyclone from below. Special measures are needed at this opening connecting the primary cyclone and the stripping zone to ensure that catalyst particles can flow downwards and striping gas and stripped hydrocarbons can flow upwards into the primary cyclone.

A disadvantage of this reactor is that the separation in the primary cyclone can be negatively influenced when level fluctuations may for example be caused by pressure fluctuations in the system, by standpipe-instabilities or slide-valve problems.

SUMMARY OF THE INVENTION

The object of the present invention is to provide a reactor in which the separation efficiency of the cyclone separation is less negatively affected by level fluctuations in the reactor vessel.

The following fluid catalytic reactor vessel achieves this object. Fluid catalytic reactor vessel comprising:

at its upper end a single centrally positioned primary cyclone having a gas-solids inlet fluidly connected to the downstream end of a fluid catalytic riser, which riser is positioned externally from a fluid catalytic reactor vessel;

said primary cyclone further provided with a gas outlet conduit at its upper end fluidly connected to one or more secondary cyclone separators, which secondary cyclone separators are positioned in the space between the centrally positioned primary cyclone and the wall of the reactor vessel and which secondary cyclones have means to discharge solids to the lower end of the reactor vessel and means to discharge a gaseous stream poor in solids to a gas outlet of the reactor vessel;

said primary cyclone further provided with a primary stripping zone at its lower end and means to discharge pre-stripped solids from the primary cyclone to the lower end of the reactor vessel;

and wherein the reactor vessel further comprises at the lower end of reactor vessel a secondary stripping zone and means to discharge stripped solids from the reactor vessel.

DETAILED DESCRIPTION OF THE INVENTION

Applicant found that the overall stripping efficiency as achieved in the reactor vessel according to the invention is enhanced. Because stripping takes place in two physically separate zones more staging and therefore a higher efficiency is achieved. This stripping efficiency is further improved when in the separate stripping zones a near counter-current contacting of catalyst and stripping gas is achieved. Preferred embodiments of the invention as shown below are especially directed to achieve just such an effect.

Furthermore, because the interior of the primary cyclone comprising the primary stripping zone is not in direct open communication with the reactor interior of the reactor vessel as for example in the reactor disclosed in U.S. Pat. No. 5,869,008, level fluctuations in said vessel do not negatively influence the separation efficiency of the cyclone as compared to the prior art design.

The design is furthermore advantageous because more space is present within the reactor vessel for internals, like for example the cyclone separators, because the riser is positioned external from the vessel. One central primary cyclone further ensures that the secondary cyclones can be positioned in an efficient manner in the space between primary and the inner reactor vessel wall.

Figure 1:
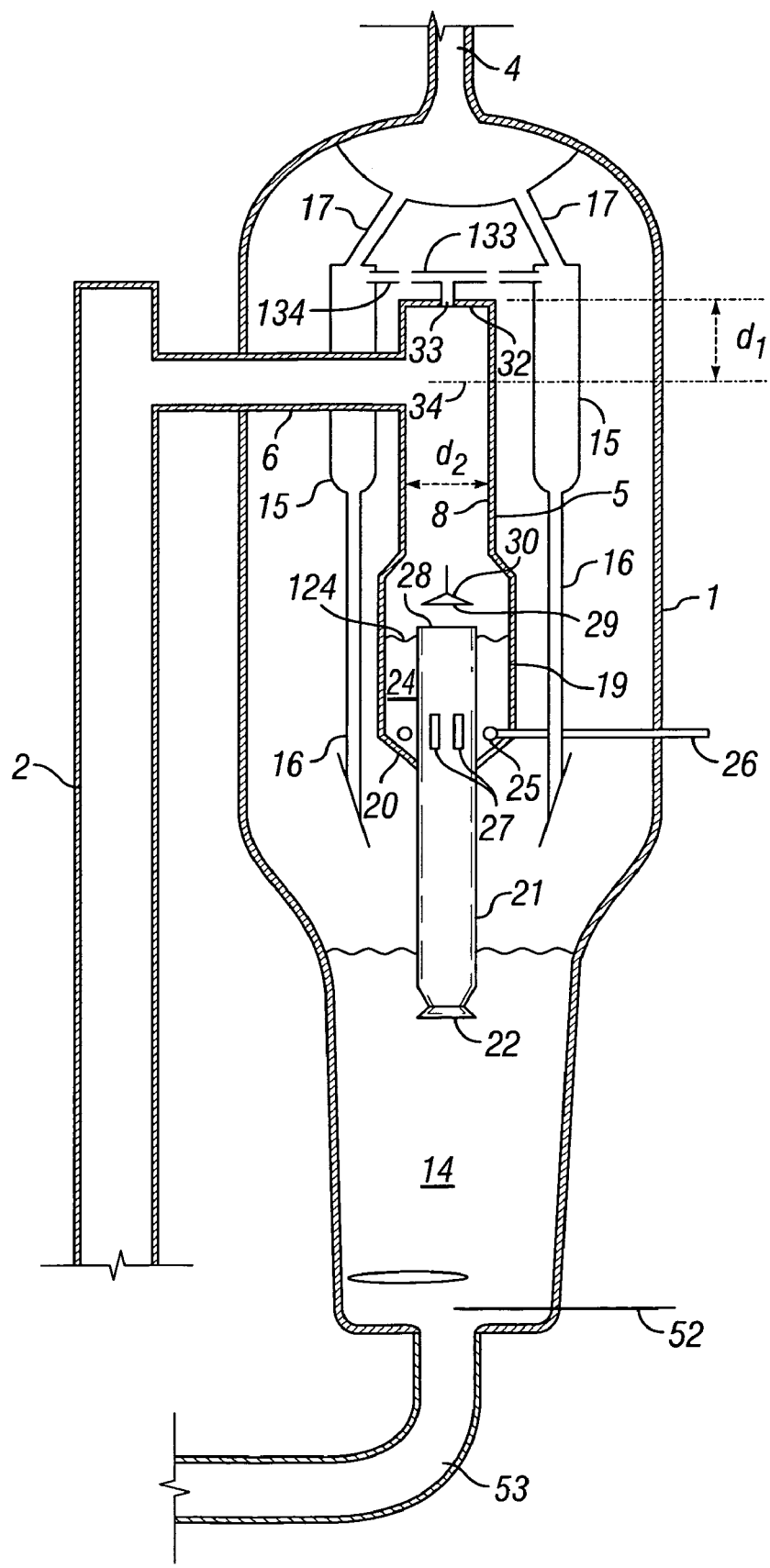
FIG. 1 shows the reactor vessel according to the invention.
Figure 2:
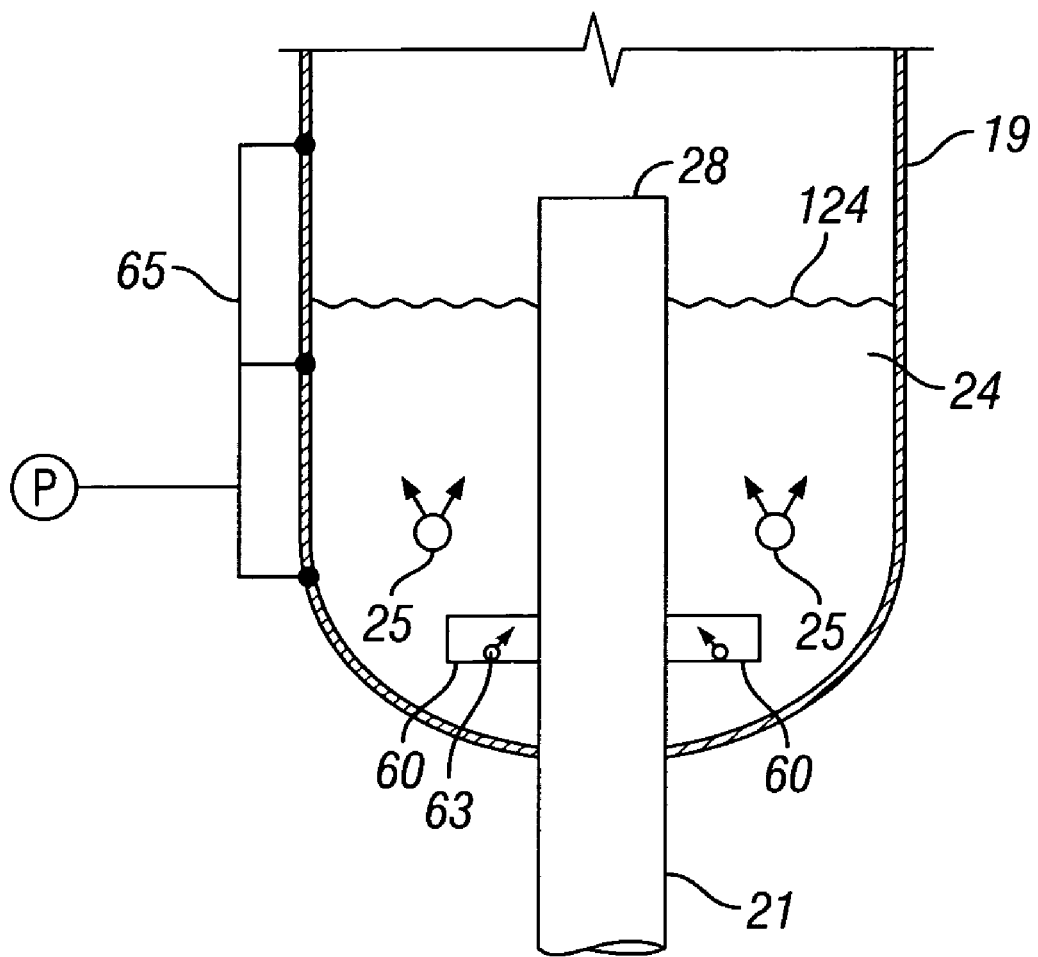
FIG. 2 shows a preferred details of the primary cyclone.

The invention will be illustrated by making use of FIGS. 1-2.

FIG. 1 shows the reactor vessel according to the invention. FIG. 2 shows a preferred detail of the primary cyclone.

The primary cyclone (5) may have an upper end, namely above the primary stripping zone, which may have a conventional design known for cyclone separators. A typical conventional cyclone is exemplified in FIGS. 17-36 of Perry's Chemical Engineers handbook, McGraw Hill, 7th ed., 1997. Cyclone separators have a cover at the upper end of the tubular housing through which the gas outlet conduit protrudes downwards. Said cover (32) and gas outlet conduit (33) are in conventional cyclone separators at substantially the same elevation as the tangentially arranged gas-solids inlet (6) as shown in the above referred to FIGS. 17-36. Applicants have found that an even better separation in the combined primary (5) and secondary (15) cyclone separators is achieved when this cover (32) is located at a higher elevation than said tangentially arranged inlet. Preferably the elevated cover is arranged at a vertical distance (d1) above the center (34) of the tangentially arranged inlet (6) and wherein the ratio of this distance (d1) and the diameter of the tubular housing (d2) is between 0.2 and 3 and more preferably between 0.5 and 2 and most preferably between 0.5 and 1.5.

The gas outlet conduit (33) of the preferred primary cyclone (5) having the elevated roof (32) may or may not protrude the roof (32) from above. If the outlet conduit (33) does not protrude the roof (34) the gas inlet opening (33') of said gas outlet conduit is flush with the roof. This embodiment is advantageous because less surface area in the cyclone will be present on which coke may settle. Applicants found that good separation efficiencies may also be achieved when the gas outlet conduit (33) protrudes substantially down to the center (34) of the tangentially arranged gas-solids inlet (6).

The gas outlet conduit (33) of the primary cyclone is fluidly connected with one or more, preferably 2-8, secondary cyclone separators (15). These secondary cyclone separators (15) are provided with diplegs (16) to discharge separated solids to the lower end of the reactor vessel to the secondary stripping zone (14). The cleaned gas leaving the secondary cyclones (15) are preferably discharged from the reactor vessel (1) via a single gas outlet conduit (4) suitably at the upper end of the reactor vessel The reactor vessel will be provided with means to discharge, from the reactor vessel, the mixture of stripping gas and hydrocarbons which are discharged from the secondary stripping zone and which flow upwards in the reactor vessel. Preferably these means are provided by openings in the conduit (33) connecting the primary and secondary cyclone separators or by openings in the connecting conduits (17) between the secondary cyclone separators (15) and the gas outlet (4) of the reactor vessel (1). A suitable opening is provided by a preferred conduit (33) between primary (5) and secondary cyclone (15), wherein said conduit (33) is comprised of two parts (133, 134) which are spaced away from each other such that gas leaving the part (133) which is connected to the gas outlet conduit (33) of the primary cyclone (5) will flow into the opening of the part (134) connected to the gas inlet of the secondary cyclone. Because the parts are spaced away from each other stripping gas and hydrocarbons from the secondary stripping zone can also enter the part connected to the secondary cyclone (15) and thus leave the reactor vessel.

Preferably the opening of the part (134) connected to the secondary cyclone (15) is greater than the opening of the other part (133). This ensures that both openings will keep facing each other when the primary cyclone (5) and the secondary cyclone (15) move relative to each other due to thermal expansion in the reactor vessel (1) when in use. This relative movement will take place when the secondary cyclones (15) are for example suspended from the roof of the reactor vessel (1) and the primary cyclone (5) is kept in place via its connection to the external reactor riser (2).

The primary cyclone is provided with a primary stripping zone at its lower end and means to discharge pre-stripped solids from the primary cyclone to the lower end of the reactor vessel. The lower end of the primary cyclone is designed such that no or substantially no stripping gas and stripped hydrocarbons from the secondary stripping zone can enter the primary stripping zone. The primary stripping zone is preferably designed to ensure a minimum residence time of the solids in said zone. Preferably said minimum residence time of the solids is 5 seconds, more preferably this residence time is greater than 10 seconds most preferably greater than 30 seconds. Suitably the residence time will be less than 60 seconds.

Preferably a primary stripping zone is provided as follows. In this embodiment the lower tubular part (19) of the primary cyclone (5) is provided with a closed lower end (20), through which closed lower end (20) a substantially vertical particle withdrawal conduit (21) extends from a position (22) below the closed lower end (20) to a position in the tubular part (19) and below the inlet (6) for receiving gas and solid particles. Said conduit is further provided with openings (27) to withdraw solid particles from the cyclone separator (5). Because said conduit (21) has a smaller cross-sectional area than the lower tubular part (19) a space (24) between conduit and inner wall of the lower tubular part is defined. Means (25) to add a stripping gas are present in the lower part of said space (24). In use a primary stripping zone will be present in space (24).

In use a dense fluidised bed will be present in the, preferably annular, space (24) between the catalyst withdrawal conduit (21) and the inner wall of the tubular part (19). The bed is kept in a fluidization mode by means of primary fluidization gas supplied to the lower end of the dense fluidised bed. Solids may be withdrawn from this fluidization zone via the openings (27) present in the particle withdrawal conduit. Preferably one or more openings are present in the upper end of the catalyst withdrawal conduit. Suitably the upper end of the particle withdrawal conduit (21) is open having opening (28). The upper most positioned openings in the conduit define the maximum fluidised bed level (124).

Preferably one or more openings (27) are also present in the lower half of the particle withdrawal conduit through which solids can be discharged from the cyclone. In normal use most solids will then be discharged through these lower positioned openings. The opening (28) at the upper end of the withdrawal conduit (21) will then only serve as withdrawal opening in case of temporary excessive catalyst flow or in case of blockage of the secondary openings (27) by for example coke or debris. In this manner more counter-current contact between stripping medium and catalyst takes place in the fluidised bed zone, which is advantageous for the stripping efficiency. More preferably a row of such openings at the same elevation are present in the lower half of the conduit. Even more preferably two or more of such rows are present above each other, wherein, in use, most solid particles will flow through the lower openings while through the upper openings gas is vented and pressure is balanced. The same effect of the two rows can be achieved by making use of rectangular designed openings (as shown; 27) wherein the elongated side of the opening extends upwards. Other possible shapes of the openings are, for example, circular, keyhole shaped, oval shaped or straight-sides holes with circular ends. These openings are suitably at the same elevation or above the position of the means to add the primary fluidizing medium, such to ensure that the solid particles are sufficiently fluidised to flow easily through the openings.

A preferred opening to withdraw solid particles from the lower tubular part (19) of the cyclone (5) is one or more substantially horizontal conduits (60) fluidly connecting the lower tubular part (19) and the particle withdrawal conduit (21), wherein said substantially horizontal conduit is provided with means (63) to add a secondary fluidizing medium. This substantially horizontal conduit (60) is positioned below the position of the means (25) to add the primary fluidizing medium of the separation cyclone as described above. Because the solid particles are not fully fluidised below the primary fluidizing means (25) solid particles will not or at a very small rate flow through these substantially horizontal conduits (60). By adding the secondary fluidizing medium separately to the connecting conduits the flow of solid particles will increase significantly. It has been found that the flow rate of FCC catalyst particles can be increased to more than 10 times by adding the secondary fluidizing medium to the connecting conduit (60). Thus a means for controlling the flow of solid particles from the fluidised bed present in the lower tubular part (19) of the cyclone (5) is obtained. This enables one to control the bed level of said fluidised bed by measuring the bed level (124), by for example well-known techniques as pressure measurements (65) at different elevations in the cyclone, and adjusting the flow of the secondary fluidizing medium to the connecting conduits (60) to adjust the bed level (124) to the desired height at different catalyst circulation rates. A well-defined and controlled bed level (124) is advantageous because all solid particles will be sufficiently contacted with the fluidizing medium before being withdrawn from the primary stripping zone. A more efficient stripping of FCC catalyst particles is thus achieved. The number of such connecting conduits (60) can be from one to forty or more, but preferably from four to sixteen per particle withdrawal conduit (21).

The means to supply stripping gas (25) suitably comprises at least one gas injection ring. This gas injection ring may be connected to a stripping gas supply conduit (26) which is either connected to the stripping supply means of the main stripping bed at the lower end of the reactor vessel, or which transfers the reactor vessel wall near the cyclone (5) itself. Preferred stripping medium is steam.

In order to avoid that the vortex present in an operational vertical primary cyclone (5) contacts and erodes the upper end of the particle withdrawal conduit or enters the optionally open upper end of said conduit, a horizontal plate may suitably be present just above said opening. More preferably a vortex stabiliser is used to terminate the vortex before it reaches the open end of the withdrawal conduit. The vortex stabiliser may comprise of a vortex stabiliser plate (29) arranged perpendicular to the central vertical axis of the cyclone and a vortex finder rod (30) arranged parallel to said axis and extending in the direction of the gas outlet (33') of the primary cyclone (5). The position of the vortex stabiliser will be between the upper end of the catalyst withdrawal conduit (21) and the cyclone inlet (6) for gas and solids. One skilled in the art taking into account the need for a certain vortex length to achieve good catalyst separation can easily determine the actual position of the vortex stabiliser.

The catalyst particles, which are discharged from the primary stripping zone, preferably via the above particle withdrawal conduit (21), will fall into the secondary stripping zone (14), which is located below said primary stripping zone in the lower end of the reactor vessel (1). The lower end of the catalyst withdrawal conduit may be submerged in the dense fluidized bed of catalyst of the secondary stripping zone (as shown) or terminate above said bed level. If the conduit (21) terminates above the fluidized bed level it is preferably provided with a valve, for example as described in WO-A-0103847. If the conduit (21) terminates below the fluidised bed level a horizontal plate is preferably present below the opening.

Preferably the lower end of the reactor vessel (1), comprising the secondary stripping zone (14), has a smaller diameter than the upper part. If the means to add stripping gas (52) for the secondary stripping zone and the means (53) to discharge stripped catalyst particles are located at the lower end of such an elongated lower reactor (1) end an advantageous counter-current contact can be achieved between upwardly moving stripping gas and downwardly moving catalyst particles. Said secondary stripping zone (14) is furthermore provided with gas re-distribution devices (not shown) which reduce the formation of large gas bubbles.

The flow of catalyst in such a primary cyclone according to the present invention is suitably between 100 and 600 kg/m$^2$.s as calculated at the cross-sectional area of the catalyst withdrawal conduit.

The above reactor vessel may find application in processes directed to catalytically crack a hydrocarbon feedstock boiling above 370° C. to fuels boiling below 370° C. Catalysts and operating conditions as well as suitable feedstocks and preferred products may be as, for example, described in General Textbook Fluid Catalytic Cracking, Technology and Operation, Joseph W. Wilson, PennWell Publishing Company, 1997.

We claim:

1. A fluid catalytic reactor system, comprising: a reactor vessel having an inner reactor vessel wall defining a space within said reactor vessel, an upper end, and a lower end;
   at said upper end a single centrally positioned primary cyclone having a gas-solids inlet for receiving gas and solid particles fluidly connected to the downstream end of a fluid catalytic riser, which said fluid catalytic riser is positioned externally from said reactor vessel;
   wherein said primary cyclone further is provided with a gas outlet conduit at its upper end fluidly connected to a secondary cyclone separator, which said secondary cyclone separator is positioned in the space between the centrally positioned primary cyclone and the inner reactor vessel wall of the reactor vessel and which said secondary cyclone comprises means to discharge solids to the lower end of the reactor vessel and means to discharge a gaseous stream poor in solids to a gas outlet of the reactor vessel;
   wherein said primary cyclone is further provided with a lower tubular part defining a primary stripping zone at its lower end and means to discharge pre-stripped solids from the primary cyclone to the lower end of the reactor vessel;
   and wherein the reactor vessel further comprises at the lower end of the reactor vessel a secondary stripping zone and means to discharge stripped solids from the reactor vessel.

2. The fluid catalytic reactor system according to claim 1, wherein the diameter of the upper end of the vessel is larger than the diameter of the lower end of the vessel at which lower location the secondary stripping zone is present.

3. The fluid catalytic reactor system according to claim 2, wherein said gas outlet conduit has an opening enabling that stripping gas from the secondary stripping zone to be discharged from the reactor vessel.

4. The fluid catalytic reactor system according to claim 3, wherein between 2 and 8 secondary cyclone separators are present.

5. The fluid catalytic reactor system vessel according to claim 4, wherein the lower tubular part is provided with a closed lower end, through which closed lower end a substantially vertical particle withdrawal conduit extends from a position below the closed lower end to a position in the tubular part and below the inlet for receiving gas and solid particles, said conduit being provided with openings to withdraw solid particles from the cyclone separator and wherein said conduit has a smaller cross-sectional area than the lower tubular part, thereby defining a space between conduit and inner wall of the lower tubular part, wherein in the lower part of said space main means to add a stripping gas of the primary stripping zone are present.

6. The fluid catalytic reactor system according to claim 5, wherein above the particle withdrawal conduit and below the inlet for receiving gas and solids a vortex finder is positioned.

7. The fluid catalytic reactor system according to claim 5, wherein a plurality of openings are present in the particle withdrawal conduit above or at the same level as the means to supply the stripping gas.

8. The fluid catalytic reactor system according to claim 6, wherein the particle withdrawal conduit is provided with one or more substantially horizontal conduits fluidly connecting the tubular part and the particle withdrawal conduit, wherein said substantially horizontal conduit is provided with means to add an extra fluidizing medium and is positioned below the position of the main means to add the primary stripping gas.

9. The fluid catalytic reactor system according to claim 1, wherein said gas outlet conduit has an opening enabling stripping gas from the secondary stripping zone to be discharged from the reactor vessel.

10. The fluid catalytic reactor system according to claim 1, wherein between 2 and 8 secondary cyclone separators are present.

11. The fluid catalytic reactor system according to claim 2, wherein between 2 and 8 secondary cyclone separators are present.

12. The fluid catalytic reactor system according to claim 1, wherein the lower tubular part is provided with a closed lower end, through which closed lower end a substantially vertical particle withdrawal conduit extends from a position below the closed lower end to a position in the tubular part and below the inlet for receiving gas and solid particles, said conduit being provided with openings to withdraw solid particles from the cyclone separator and wherein said conduit has a smaller cross-sectional area than the lower tubular part, thereby defining a space between conduit and inner wall of the lower tubular part, wherein in the lower part of said space main means to add a stripping gas of the primary stripping zone are present.

13. The fluid catalytic reactor system according to claim 2, wherein the lower tubular part is provided with a closed lower end, through which closed lower end a substantially vertical particle withdrawal conduit extends from a position below the closed lower end to a position in the tubular part and below the inlet for receiving gas and solid particles, said conduit being provided with openings to withdraw solid particles from the cyclone separator and wherein said conduit has a smaller cross-sectional area than the lower tubular part, thereby defining a space between conduit and inner wall of the lower tubular part, wherein in the lower part of said space main means to add a stripping gas of the primary stripping zone are present.

14. The fluid catalytic reactor system according to claim 3, wherein the lower tubular part is provided with a closed lower end, through which closed lower end a substantially vertical particle withdrawal conduit extends from a position below the closed lower end to a position in the tubular part and below the inlet for receiving gas and solid particles, said conduit being provided with openings to withdraw solid particles from the cyclone separator and wherein said conduit has a smaller cross-sectional area than the lower tubular part, thereby defining a space between conduit and inner wall of the lower tubular part, wherein in the lower part of said space main means to add a stripping gas of the primary stripping zone are present.

15. The fluid catalytic reactor system according to claim 6, wherein a plurality of openings are present in the particle withdrawal conduit above or at the same level as the means to supply the stripping gas.

16. The fluid catalytic reactor system according to claim 5, wherein the particle withdrawal conduit is provided with one or more substantially horizontal conduits fluidly connecting the tubular part and the particle withdrawal conduit, wherein said substantially horizontal conduit is provided with means to add an extra fluidizing medium and is positioned below the position of the main means to add the primary stripping gas.

* * * * *